Sept. 8, 1925.                                                                                        1,552,678
                                            C. J. COBERLY
                       MEANS FOR ATTACHING GAS DELIVERY TUBES OF CUTTING TORCHES
                                          Filed Jan. 2, 1924
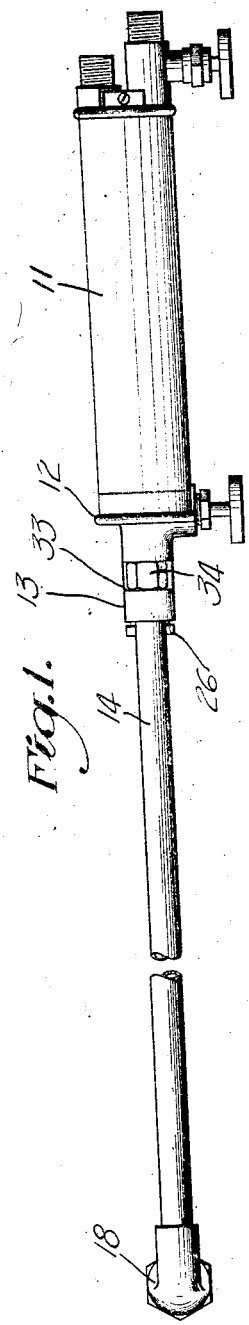
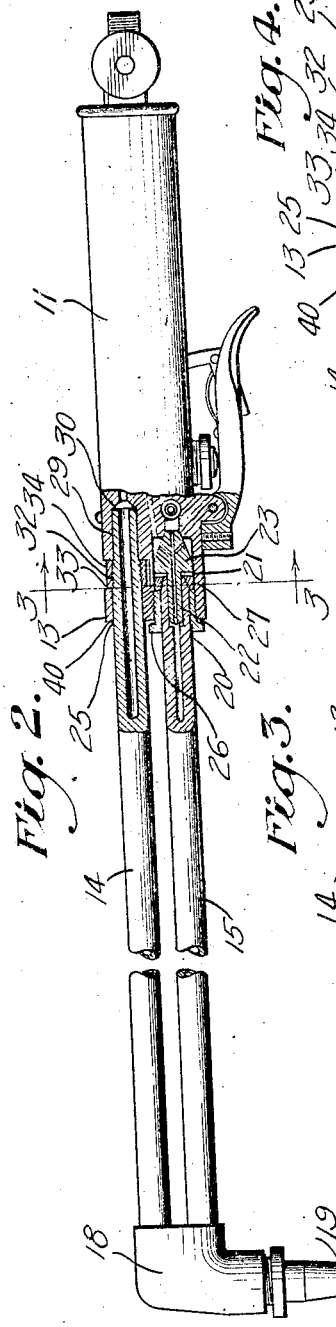
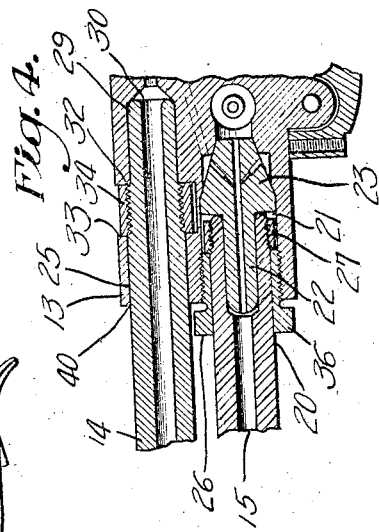
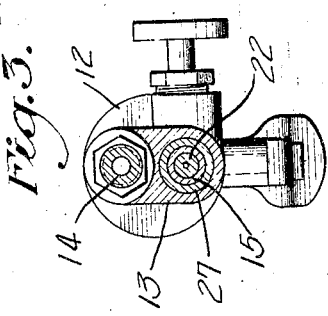
INVENTOR
CLARENCE J. COBERLY
BY
Graham + Davis
ATTORNEYS Patented Sept. 8, 1925.

1,552,678

UNITED STATES PATENT OFFICE.

CLARENCE J. COBERLY, OF LOS ANGELES, CALIFORNIA, ASSIGNOR, BY MESNE ASSIGNMENTS, TO PUROX COMPANY, OF DENVER, COLORADO, A CORPORATION OF COLORADO.

MEANS FOR ATTACHING GAS-DELIVERY TUBES OF CUTTING TORCHES.

Application filed January 2, 1924. Serial No. 684,096.

*To all whom it may concern:*

Be it known that I, CLARENCE J. COBERLY, a citizen of the United States, residing at Los Angeles, in the county of Los Angeles and State of California, have invented a new and useful Means for Attaching Gas-Delivery Tubes of Cutting Torches, of which the following is a specification.

This invention relates to the construction of cutting torches of the type used for cutting metals with a stream of oxygen. Such torches are ordinarily designed for the use of oxygen and acetylene and are provided with a burner head having a cutting tip to which the combustible mixture of acetylene and oxygen is delivered through one pipe and the oxygen through another pipe. These pipes extend from the mixing head situated in the handle of the torch to the burner head and are ordinarily removably secured in the mixing head by screw threaded fixtures. The wrench engagement portions provided on these attachment fixtures necessitates the spreading apart of the gas delivery tubes with the result that the width of the handle is quite large.

It is the principal object of the invention to provide a means for attaching the gas delivery tubes in such a manner that they may be placed relatively close together, thus allowing the size of the delivery tubes to be considerably reduced in size, therefore reducing the weight of the torch and permitting a more perfect balance which is very desirable.

The especial advantages of the invention and further objects thereof will be made evident hereinafter.

Referring to the drawing which is for illustrative purposes only:

Fig. 1 is a plan view of cutting torch embodying the features of the invention.

Fig. 2 is a side elevation of the cutting torch partially in section to illustrate the features of the attachment means employed therewith.

Fig. 3 is an enlarged section taken upon a plane represented by the line 3—3 of Fig. 2.

Fig. 4 is an enlarged fragmentary section corresponding to the sectioned portion of Fig. 2.

The cutting torch shown in the drawing consists of a handle or grip portion 11, having a head 12 in the forward end thereof in which the mixing chamber is situated. From the oblate portion 13 of the head 12, an oxygen delivery tube 14 and a combustible gas mixture tube 15 are forwardly extended to a burner head 18 in which the cutting tip 19 is placed. As shown in Figs. 2 and 4, the inner end 20 of the combustible gas delivery tube 15 extends into an opening 21 provided in the portion 13 of the mixing head and extends over the nozzle 22 of a mixer 23 situated within the opening 21. When it is necessary to change the mixer 23, the tube 15 must be removed from the opening 21 which removal necessitates also the removal of the tube 14 from the opening 25 into which it extends. For securing the tubular member 15 in the opening 21, a bushing 26 is employed which surrounds the member 15, threads into the mouth of the opening 21 and bears against a shoulder formed by a collar 27 threaded upon the end 20 of the member 15.

The tubular member 14 is somewhat longer than the member 15 and the reduced end 29 thereof extends into the bottom 30 of the opening 25 which is of reduced diameter, so that the end 29 sets snugly therein. Adjacent to the reduced end 29, screw threads 32 are formed upon the tubular member 14 and in an open notch 33 cut into the oblate portion 13 from the top thereof and at a position spaced away from the end and corresponding with the position of the threads 32 formed upon the member 14, a nut 34 is situated which screws upon the threads 32 and thus draws the tubular member 14 securely into place in the opening 25. By this construction, the tubular members 14 and 15 may be spaced just far enough apart to allow clearance of the wrench engagement portion 36 of the bushing 26 which holds the tubular member 15 in place.

It will be recognized that if both tubular members were secured by bushings, they would have to be spaced further apart to provide the space required for wrench engagement portions of two bushings, instead of the space required for the single bushing as shown in the drawing.

By employing threaded attachment members in off-set relationship in the manner shown, it is possible to reduce the height of the outwardly extended portion of the mixing head without affecting the strength thereof. It will be readily recognized that the forward portion of the opening 25 may be made to fit closely around the tube, as indicated at 40, thus providing a rigid support for the tube. The construction shown also prevents the application of twisting strains upon the bushing 26 because of the rigid support of the member 14.

I claim as my invention:

1. In a torch, the combination of: a mixing head having a pair of outlet openings therein, and a lateral notch communicating with one of said openings at an intermediate point thereof; a burner head; a pair of delivery tubes extending from said burner head and engaging into the respective outlet openings of the mixing head; a nut disposed in said notch in threaded engagement with one of said tubes; and a bushing for securing the other of said tubes in the other outlet opening.

2. In a torch, the combination of: a mixing head having a pair of parallel bores and a lateral notch intersecting one of said bores intermediate its ends; a burner head; a pair of parallel delivery tubes extending from said burner head and engaging into the respective bores of the mixing head; a nut disposed in said notch in threaded engagement with one of said tubes; and a bushing for securing the other of said tubes in the other bore.

3. In a torch, the combination of: a mixing head having a pair of parallel closely adjacent bores and a lateral notch intersecting one of said bores intermediate its ends; a burner head; a pair of parallel delivery tubes extending from said burner head and extending into the respective bores of the mixing head; a nut disposed in said notch in threaded engagement with one of said tubes; and a bushing for securing the other tube in the other of said bores, the head of said bushing being in close proximity to the side wall of the adjacent tube.

4. In combination: a member from which an outlet is taken comprising a body having an outer bore, an inner bore of smaller diameter than said outer bore and in alignment therewith, and a notch communicating between the inner end of said outer bore and the outside of said body; a tubular member having a portion adjacent to its end arranged to fit said outer bore and the end thereof of a size to fit said inner bore, said portion arranged to fit said outer bore being threaded; and a nut disposed in said notch and engaging the threads on said member, for drawing said member inwardly in said openings.

5. In a torch, the combination of: a mixing head having a pair of outlet openings therein and a lateral notch communicating with the first of said openings; a burner head; a pair of delivery tubes extending from said burner head, the first of said tubes communicating with said first opening and the second of said tubes communicating with the second of said openings and being of less length than said first tube; a bushing for securing said second tube in said second opening; and a nut disposed in said notch in threaded engagement with said first tube.

6. In a torch, the combination of: a mixing head having a pair of outlet openings therein and a lateral notch communicating with the first of said openings; a removable mixer in the second of said openings; a burner head; a pair of delivery tubes extending from said burner head, the first of said tubes communicating with said first opening and the second of said tubes communicating with the second of said openings and being of less length than said first tube; a bushing for securing said second tube in said second opening, said bushing being threaded in the mouth of said opening and functioning to force said second tube against said mixer, and thereby to seat said mixer firmly in operative position; and a nut disposed in said notch in threaded engagement with said first tube.

7. In a torch, the combination of: a mixing head having a pair of parallel closely adjacent bores and a lateral notch intersecting one of said bores intermediate its ends; a burner head; a pair of parallel delivery tubes extending from said burner head, one tube engaging into the notched bore of the mixing head, and having a screw-threaded portion, and the other tube engaging into the adjacent bore thereof and having a shoulder near its end; a nut disposed in said notch and engaging the screw-threaded portion of the first named tube; and a bushing having a screw-threaded engagement in the adjacent bore and engaging the shoulder of the second named tube.

In testimony whereof I have hereunto set my hand at Los Angeles, California, this 21st day of December, 1923.

CLARENCE J. COBERLY.